United States Patent
Zielinski et al.

(10) Patent No.: US 6,932,695 B1
(45) Date of Patent: Aug. 23, 2005

(54) VANE FOR AN AIR OUTLET

(75) Inventors: Mary K Zielinski, Novi, MI (US);
Norman D Kleiner, Otisville, MI (US);
Timothy W Anness, Rochester Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/975,759

(22) Filed: Oct. 28, 2004

(51) Int. Cl.[7] .................................................. B60H 1/34

(52) U.S. Cl. ...................................... 454/155; 454/143

(58) Field of Search .................... 454/155, 69, 143, 454/154; 16/DIG. 30

(56) References Cited

U.S. PATENT DOCUMENTS

| | | | | |
|---|---|---|---|---|
| 3,024,555 A | * | 3/1962 | Abeles | 40/331 |
| 6,245,435 B1 | * | 6/2001 | O'Brien et al. | 428/472 |
| 6,412,145 B1 | * | 7/2002 | Rubel | 16/412 |
| 6,652,371 B2 | * | 11/2003 | Kamio | 454/155 |

* cited by examiner

*Primary Examiner*—Derek S. Boles
(74) *Attorney, Agent, or Firm*—Ralph E. Smith

(57) ABSTRACT

Apparatus for controlling air flow in a ventilating system of an automotive vehicle includes a series of interconnected vanes with a control knob on one of the vanes for adjusting the vanes. A chrome-plated insert fits into a slot in the knob. A rubber overlay covers the knob but exposes the insert. The method includes integrally molding the vane and the knob and in the molding process forming a slot in the knob, molding an overlay of rubber on the knob but with an opening in the overlay exposing the slot, and pressing the insert into the slot through the opening in the overlay.

14 Claims, 3 Drawing Sheets

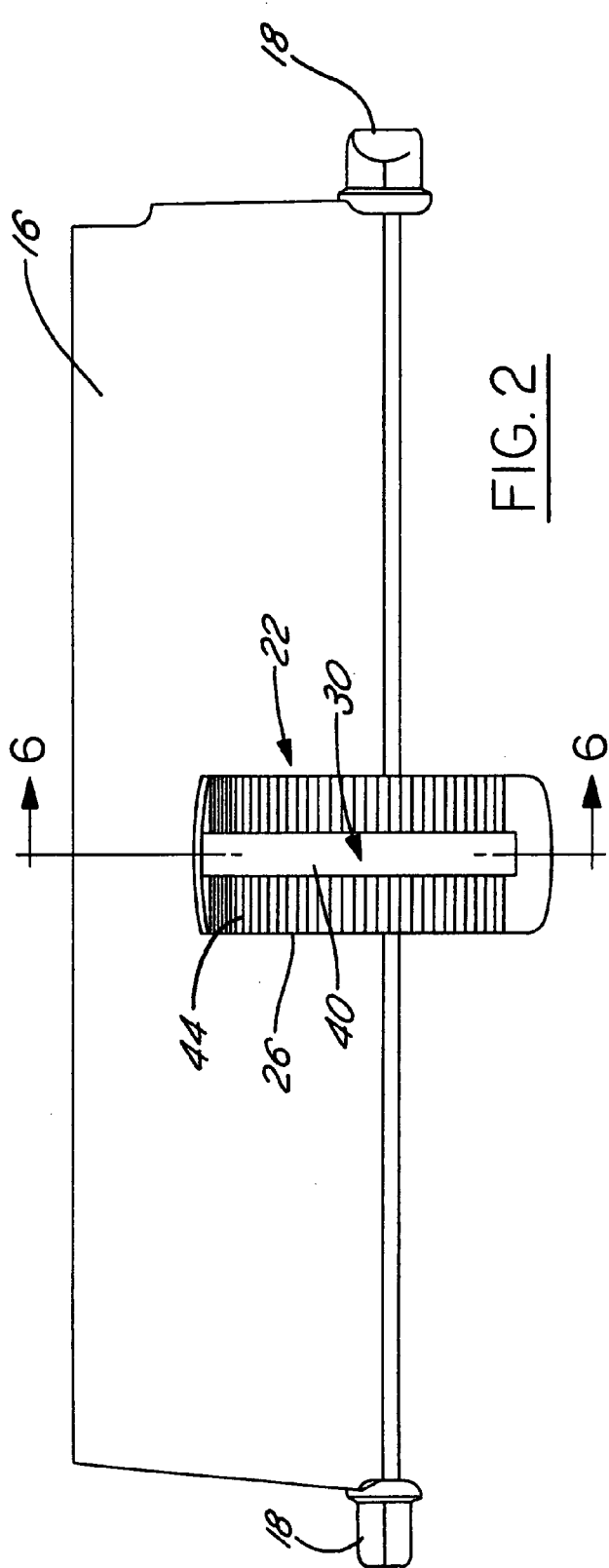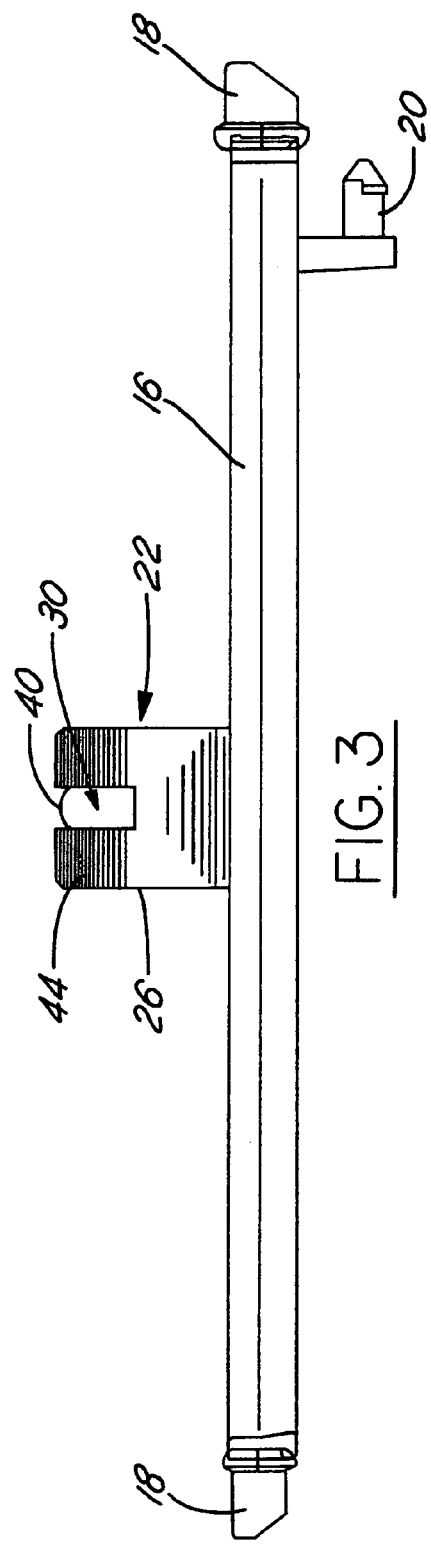

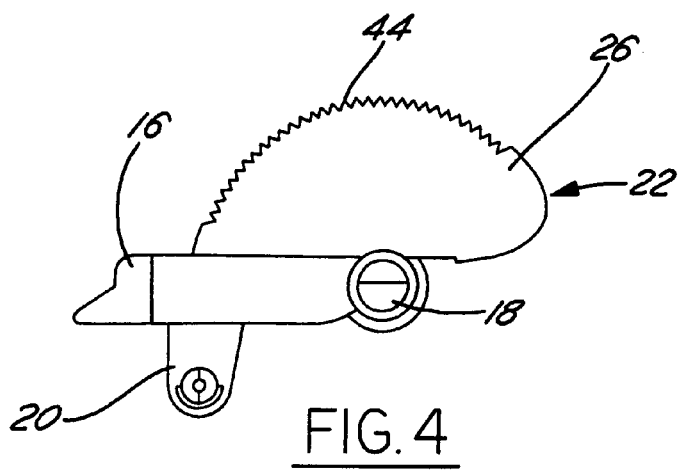
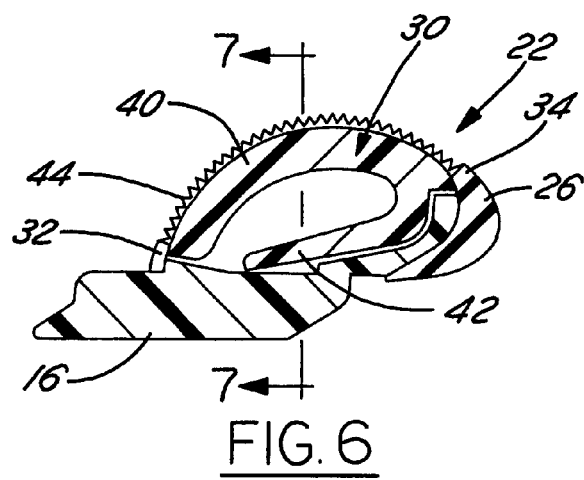
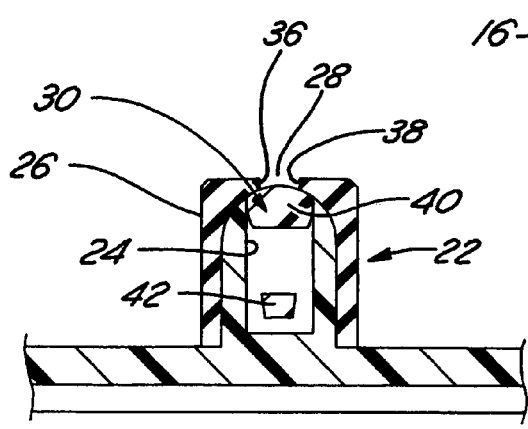

VANE FOR AN AIR OUTLET

FIELD OF THE INVENTION

This invention relates generally to a vane for use in an air outlet of a ventilating system in an automotive vehicle, and more particularly to a knob on the vane for moving the vane to different positions.

BACKGROUND OF THE INVENTION

The air outlet of a ventilating system is often opened and closed by a series of vanes. The vanes are interconnected so that they move in unison. One of the vanes usually has a knob which can be used to adjust the vanes and control the volume and/or the direction of air flowing from the outlet.

Heretofore, in accordance with one approach, the knob has been formed as an integral part of the vane. The knob is plated with chrome or a similar bright, shiny material. The vane with the chrome-plated knob is then placed in a mold in which an overmold of rubber or similar elastomeric material is applied over the entire outer surface of the chrome-plated knob except for a narrow area which is not rubber-overmolded and hence is exposed to view. The rubber-overmold provides a friction surface enabling the vane to be adjusted easily by a thumb or finger of a vehicle occupant, and the exposed portion of the chrome-plate gives the knob an attractive appearance.

One problem with this procedure is that when overmolding the rubber on the chrome-plated knob, an edge of the mold cavity which contacts the chrome around the exposed area can make scratch marks on the chrome.

Alternatively, the vane and knob have been formed separately, with the knob inserted in a preformed hole in the vane. The two parts may be attached by a heat stake or a simple snap fit, but either way, the attachment is visible when the vane is tilted upwardly. These alternative methods involve additional machining costs as well as additional time and labor.

SUMMARY OF THE INVENTION

In accordance with the present invention, the knob is formed with a slot, and a decorative insert is pressed into the slot. The decorative insert may be precoated with chrome or any similar bright and shiny material. An overlay of elastomeric material covers the knob but exposes the insert. It is also preferable to employ an insert which is resilient and is held in the slot under compression.

In accordance with the method of the present invention, the vane and knob are integrally molded in a molding process. A slot is formed in the knob, preferably as part of the molding process. Thereafter the elastomeric material is molded on the knob as an overlay with an opening in the overlay exposing the slot. The decorative insert is then inserted into the slot through the opening in the overlay.

One object of this invention is to provide a vane with an adjusting knob for the outlet of an air ventilating system and a method of making it, having one or more of the foregoing features and advantages.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a top view of one of the vanes,

FIG. 3 is a side view of the vane shown in FIG. 2;

FIG. 4 is an end view of the vane;

FIG. 6 is a sectional view taken on the line 6—6 in FIG. 2; and

FIG. 7 is a sectional view taken on the line 7—7 in FIG. 6.

DETAILED DESCRIPTION OF THE PREFERRED EMBODIMENT

The following description of the preferred embodiment is merely exemplary in nature and is in no way intended to limit the invention, its application, or uses.

Figure 1:
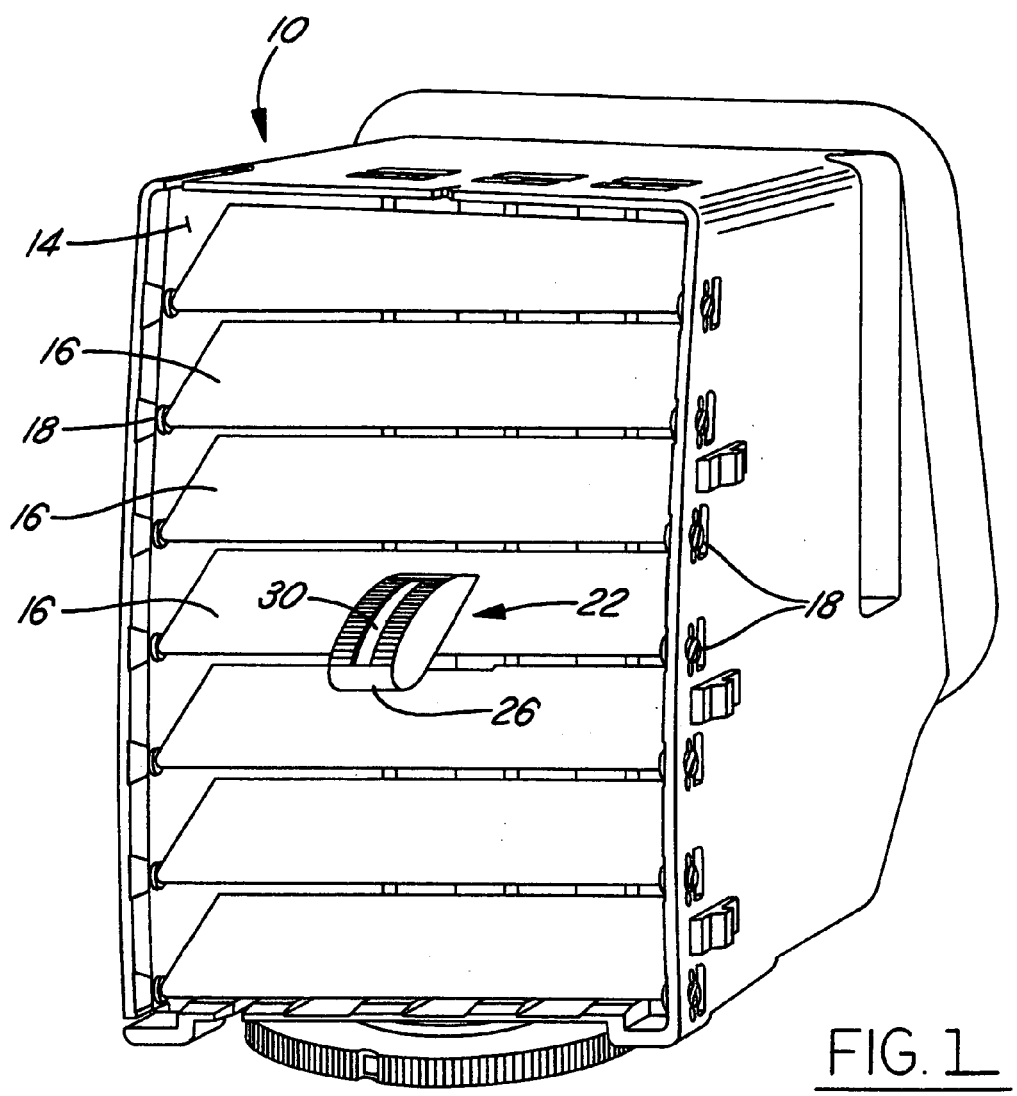
FIG. 1 is a perspective view of a housing for an air outlet of a ventilating system of an automotive vehicle showing the vanes thereof in a partly open position.
Figure 5:
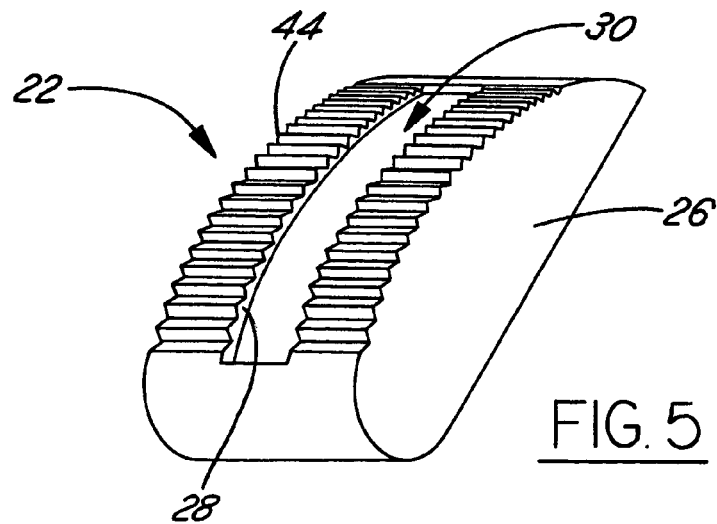
FIG. 5 is an enlarged perspective view of the knob formed on the vane.

Referring now more particularly to the drawings, and especially to FIG. 1, there is shown a housing 10 mounted on a dashboard of an automotive vehicle. The housing 10 is part of an air ventilating system and has an air outlet 14 which is controlled by a series of parallel vanes 16 extending across the outlet. The vanes are made of a relatively rigid material, such as a suitable plastic.

Referring to FIGS. 2–4, the ends of the vanes 16 have pins 18 pivoted in holes provided in the housing 10, enabling the vanes to rotate. The vanes 16 are interconnected by a linkage which attaches to the link pins 20 so that the vanes rotate in unison from a position closing the outlet to a position opening the outlet. The vanes 16 also can be rotated to any intermediate position to control the volume and/or direction of air flowing through the outlet.

A knob 22 is provided on one of the vanes. The knob is used to manually adjust the position of the vanes 16. The knob may be formed integrally with the vane. A slot 24 is formed in the knob, the slot extending perpendicular to the lengthwise dimension of the vane.

An overlay 26 of an elastomeric material, preferably rubber, covers the entire outer surface of the knob except for the narrow area along the slot 24 which is not covered, providing an opening 28 over the slot which leaves the slot exposed.

A decorative insert 30 is placed in the slot 24. The insert may be generally C-shaped as shown or have other configurations and is preferably made of a suitable flexible, resilient material, either metal or plastic. The insert is coated or plated with a bright, shiny material, preferably chrome. The insert 30 may be pressed through the opening 28 in the overlay and into the slot 24 until the insert is compressed down on the bottom of the slot.

The overlay 26 has end retainer portions 32 and 34 at opposite ends of the opening 28 which overlap the ends of the insert 30. The opposite side edges of the insert are overlapped by side retainer portions 36 and 38 of the overlay along the sides of the opening 28. The retainer portions 32, 34, 36 and 38 hold the insert 30 down on the bottom of the slot under compression.

The insert is shown as having a crown 40 which is curved to follow the curve of the slot, and a tail 42 which bears on the bottom of the slot.

The method of making the vane with the knob includes integrally forming the vane 16 and the knob 22 in the cavity of a mold in a single molding process. Preferably, the slot 24 is formed in the knob 22 as part of the molding process although it may be formed in the knob after taking the vane and knob out of the mold.

The overlay 26 of elastomeric material, preferably rubber, is molded on the knob 22 to cover the entire outer surface of the knob except for the narrow area along the slot 24 which is not covered, to provide the opening 28 over the slot and leave the slot exposed.

The decorative insert 30 is formed in a separate operation and is coated or plated with a bright shiny material, the material preferably being chrome. The chrome-plated insert 30 is then pressed into the slot 24 through the opening 28 in the overlay and held down by the overlay so that it is compressed against the bottom of the slot. As previously stated, the overlay has end retainer portions 32 and 34 which overlap opposite ends of the insert when the insert is pressed into the slot and also has side retainer portions 36 and 38 along opposite sides of the slot likewise pressing down on the insert. The insert, has a crown portion 40 which is curved to follow the general contour of the slot so as to be clearly visible, and also to provide a tail 42 which presses down on the bottom of the slot to hold the insert in compression.

The portions of the overlay extending along opposite sides of the insert may be knurled as shown at 44 to provide roughened surfaces which facilitate adjustment of the vane.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. Apparatus for controlling air flow in a ventilating system of an automotive vehicle comprising:
   a movable vane,
   a knob on said vane for moving said vane between an open position and a closed position,
   said knob having a slot,
   a decorative insert in said slot, and
   an overlay of an elastomeric material covering said knob but exposing said insert.

2. The apparatus of claim 1, wherein said insert is plated with a bright, shiny material.

3. The apparatus of claim 1, wherein said slot extends in a plane perpendicular to a lengthwise dimension of said vane, and said overlay has portions extending along opposite sides of said insert.

4. The apparatus of claim 3, wherein the portions of said overlay along opposite sides of said insert have knurled outer surfaces to facilitate moving said vane.

5. The apparatus of claim 4, wherein said overlay has retainer portions which overlap opposite ends of said insert to retain said insert in the slot.

6. The apparatus of claim 5, wherein opposite side edges of said insert are overlapped by said overlay.

7. The apparatus of claim 6, wherein said insert is resilient and is held in said slot under compression by said retainer portions.

8. The apparatus of claim 6, wherein said insert is resilient and generally C-shaped and is held in said slot under compression by said retainer portions.

9. The apparatus of claim 8, wherein said insert is chrome-plated.

10. A method of making a vane and a knob for adjusting the vane to control air flow in a ventilating system of an automotive vehicle, comprising the steps of:
    1) integrally forming the vane and the knob in a molding process,
    2) forming a slot in the knob,
    3) molding an overlay of elastomeric material on said knob but with an opening in the overlay exposing the slot, and
    4) pressing a decorative insert into the slot through the opening in the overlay.

11. The method of claim 10, wherein the slot is formed in the knob as part of the molding process in step 1.

12. The method of claim 11, wherein said overlay is molded in step 3 to provide end retainer portions which overlap opposite ends of said insert when said insert is pressed into the slot in step 4.

13. The method of claim 12, wherein said overlay is molded in step 3 to provide side retainer portions which overlap opposite sides of the insert when the insert is pressed into the slot in step 4.

14. The method of claim 13, wherein said insert is resilient and generally C-shaped and held in said slot under compression by the end and side retainer portions after being pressed into said slot in step 4.

* * * * *